INVENTOR
J.T.H. CHANG
BY William H. Kamstra
ATTORNEY

Aug. 12, 1969 J. T. H. CHANG 3,461,440

CONTENT ADDRESSABLE MAGNETIC MEMORY

Filed Nov. 24, 1964 3 Sheets-Sheet 3

United States Patent Office 3,461,440

Patented Aug. 12, 1969

3,461,440

CONTENT ADDRESSABLE MAGNETIC MEMORY

James T. H. Chang, New Providence, N.J., assignor to Bell Telephone Laboratories, Incorporated, New York, N.Y., a corporation of New York Filed Nov. 24, 1964, Ser. No. 413,444
Int. Cl. G11b 5/00
U.S. Cl. 340—174 33 Claims

ABSTRACT OF THE DISCLOSURE

A content addressable memory element including reference and information storage locations is written by fixing the orientation of remanent magnetization in the storage location in accordance with available information. The element is interrogated to determine the type of information value stored therein by applying a sampling field to both a reference location and a storage location and summing the resulting signals induced in circuits coupled to such locations. The element is thereafter read out by applying a readout pulse to the summing circuit which links the information location and sensing the resulting signal induced in a further circuit which had been used to apply the sampling field. A pair of the memory elements are combined to form a bit storage location wherein one element is interrogated to determine whether or not the bit location stores a binary "1" and the other element is interrogated to determine whether or not the bit location stores a "0." A plurality of bit locations of the type described are combined in a multidimensional content addressable memory array.

Figure 1:
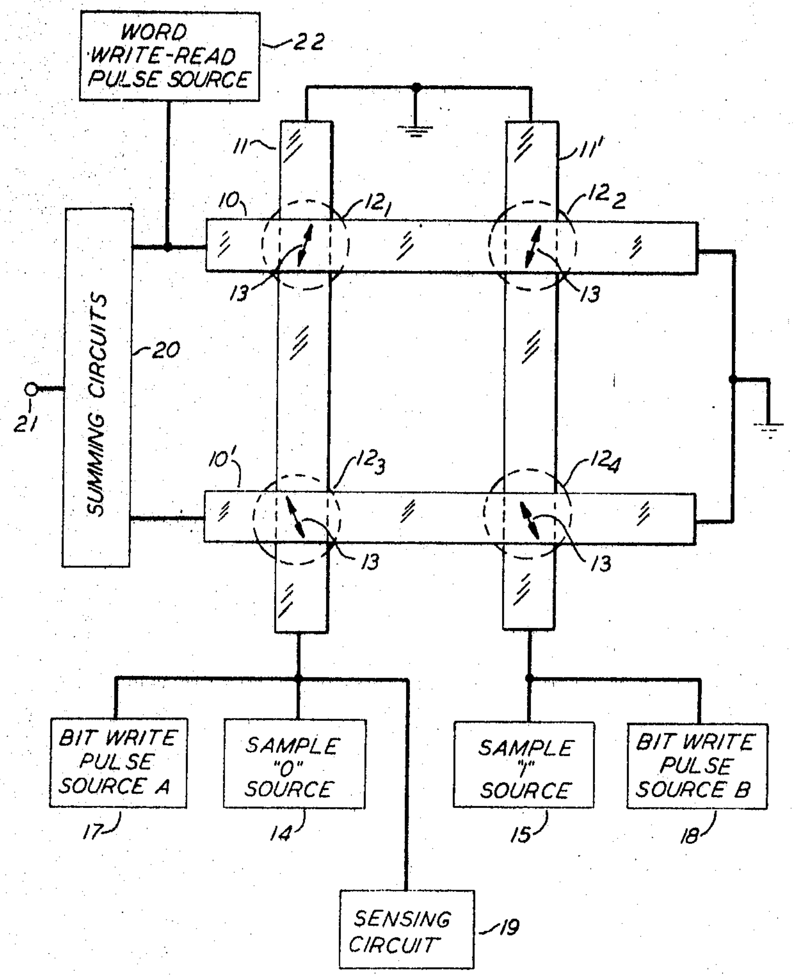

This invention relates to magnetic memory devices and circuits and particularly to such devices and circuits adapted to store information which may be retrieved on the basis of its character rather than its physical location.

Conventional information handling systems in which an address of a memory is interrogated without regard to its information content have long been known in the art. In a system of this type an address, the location within the memory of which is known and has been selected, is interrogated to determine the character of the information that it contains. The system may then operate further in accordance with the previously unknown information which was found in the interrogated address. An electronic telephone system, for example, may, in response to a call for a particular service, refer to a predetermined address in a memory for the instructions there contained. The subsequent operation of the telephone system is then controlled in accordance with the information read out of the interrogated address. Manifestly, if the system is to operate consistently in response to service requests, the information read out of the memory, if read out destructively, must be restored to the proper address. In other known systems all of the addresses in a memory may be sequentially interrogated to reach one or more desired addresses to determine their contents.

In particular information handling applications it is frequently necessary to determine if information of a certain character is present in the memory and, if present, its specific details. In such a case there may be no interest whatever in the physical location of the address within the memory of the requested information. A memory may, by way of example, store the directory information of all the subscribers of a telephone system. It may then be necessary to determine the names of all of the subscribers, if any, and their directory numbers, who may be listed at a given residence address. One obvious means of accomplishing a search for this information is suggested in the foregoing. The addresses of the memory may be sequentially interrogated beginning with the memory address of the first listed subscriber and continuing through the entire directory memory. The directory information of each subscriber would of necessity have to be compared with the given residence address. Whether or not a match is found, that is, whether or not any subscriber has listed the given residence address, the directory information must be restored to the memory after the comparison operation. Such a complete interrogation of the directory memory to find perhaps one word of information is obviously time-consuming and seriously limits the effective time that the directory memory is available for reference.

The time required to search through a complete memory for even a single information word may be substantially reduced if means are provided for determining the character of the information stored in each of the addresses of a memory without regard to the location of the addresses in the memory. Memories permitting the retrieval of information on the basis of its character rather than its physical location, termed associative memories, are also known in the art. In such memories, after the desired information word or words have been located, the addresses within the memory are marked, and then read out. If the read out has been destructive and it is required that the same information be available for future reference, the information is also restored to the memory in the proper addresses. The presence of particular information in an associative memory and its location is determined by searching the memory, not for an entire information word, but only for known elements of the word or words being searched for. In the telephone directory memory example cited in the foregoing, for example, the memory is searched for the information word or words giving the directory information of all subscribers, if any, listed at a certain residence address. The search is then conducted only for the information element representing the known address. This element may be designated the associative element of the information word and from the foregoing telephone directory example, it is clear that a word of information may have as many associative elements as the particularity of the read out may demand. Further, it is also clear from the example that more than one information word may have the same associative elements. In an associative memory, information is thus retrieved by searching for known elements of an information word while ignioring all the rest. When a word or words of information are located which include therein the associative elements, they may then be read out to determine the character of the unknown elements.

During the search of the associative memory for the information containing the associated elements, the stored information should be nondestructively compared with the associative information elements. If a match is found the matching information word or words must be accessed to read out the information located, this readout advantageously also being nondestructive. If more than one information word responds to the interrogating associative elements, provision may also be made for an ordered retrieval of the information.

It is an object of the present invention to provide a novel binary bit address circuit adapated for nondestructive interrogation in an associative memory circuit.

It is another object of this invention to provide a new and novel memory circuit from which information is retrieved on the basis of its address content rather than on the physical location of an address within the memory.

Another object of this invention is a novel magnetic binary storage cell which may be nondestructively sampled and also nondestructively read out.

A further object of this invention is a new and improved magnetic memory system in which large numbers of information words may be searched at one time.

The foregoing and other objects of this invention are realized in one illustrative associative memory in which each of the bit addresses comprises a rectangular grouping of four magnetic thin films each having uniaxial anisotrophy and substantially rectangular hysteresis characteristics. The films are inductively coupled to the intersections of two pairs of transversely arranged flat strip solenoids in a manner so that each solenoid is uniquely associated with a different two of the four films. Information is stored in the bit address in the form of particular directions of remament magnetization along the easy magnetic axes of the films. The easy axes are inclined at a small angle to one side of the longitudinal axes of one pair of the solenoids with the result that a current pulse applied to any one of the solenoids will cause a rotation of the magnetization in the associated films toward the hard magnetic axis. If the pulse amplitude is sufficiently limited, the rotation will be less than that required to complete a rotation to the opposite direction along the easy axis of a film and, at the termination of the pulse, the rotated magnetization returns to the original direction along the easy axis. This return makes possible the nondestructive sensing of the information stored in a bit address circuit according to one aspect of this invention. The magnetic state of any film may be changed in direction during a write phase by applying, in addition to the limited pulse on one of the defining solenoids of the film, a small, concurrent "tipping" current pulse to the other solenoid which defines the film in the group. Selective writing in the bit addresses of a word row of the memory is thus effected.

The bit address circuits are organized in the memory in the conventional manner, one pair of the solenoids of an address film group lying in the bit line coordinates of a memory array and the other pair of solenoids lying in the word line coordinates. After information has been written into the memory during a write phase of operation, the information is interrogated on two occasions, first, to compare the contents of particular bit addresses of an information word with predetermined associative criteria and, secondly, to read out the information once a match is found during the earlier comparing, or sampling, phase. Both of these interrogations are accomplished by pulsing particular ones of the solenoids, and it is a feature of this invention that the solenoids may be used both for input and output access to the memory. In briefly describing the interrogation operations of an illustrative memory, access for these operations to a single bit address circuit only need be considered for an understanding of the principles of this invention. In sampling a bit address for a binary "1" or "0," sampling current pulses are individually applied to different solenoids of the bit line coordinate solenoid pairs. Since each bit line solenoid controls the magnetization rotation in two of the films of the bit address, output signals will be induced in the two solenoids of the word line pair for either binary value stored in the address. These output signals are algebraically added in a summing circuit the output of which will indicate whether or not the bit address contains the binary value being searched for. If a bit address appears in a word line of the memory which contains the entire information word being searched for, the address is read out by applying a limited readout pulse to one of the word line solenoids. Although, as a result, magnetization rotations will be caused in both of the films defined thereby in a bit address, the readout signal generated in only one need be considered since either signal will be indicative of the stored binary value.

As previously mentioned, both the sampling and readout operations are advantageously nondestructive.

The single bit address, the organization and operation of which were briefly considered in the foregoing, is advantageously adapted as the basic storage element of an associative memory in that its novel sampling operation permits a plurality of bit addresses lying in a bit line of the memory to be interrogated simultaneously. Since the outputs of the sampling operations of the bit addresses along a bit line are parallelly taken from word row solenoids, it is apparent that no interference among such outputs will result. In sampling a bit address circuit for either a "1" or a "0," if the address contains the value searched for, the sum output of the summing circuit will be effectively a zero signal. Thus, in searching a word row of the memory for a plurality of associative elements, either "1's" or "0's," or both, if a signal appears at the output of the summing circuit of the word row, the signal indicates that this row does not contain the information word being searched for. On the other hand, if no signal appears at the output of the summing circuit, a match will have been found in the information word stored in the word row for each of the predetermined associative criteria elements.

Figure 2:
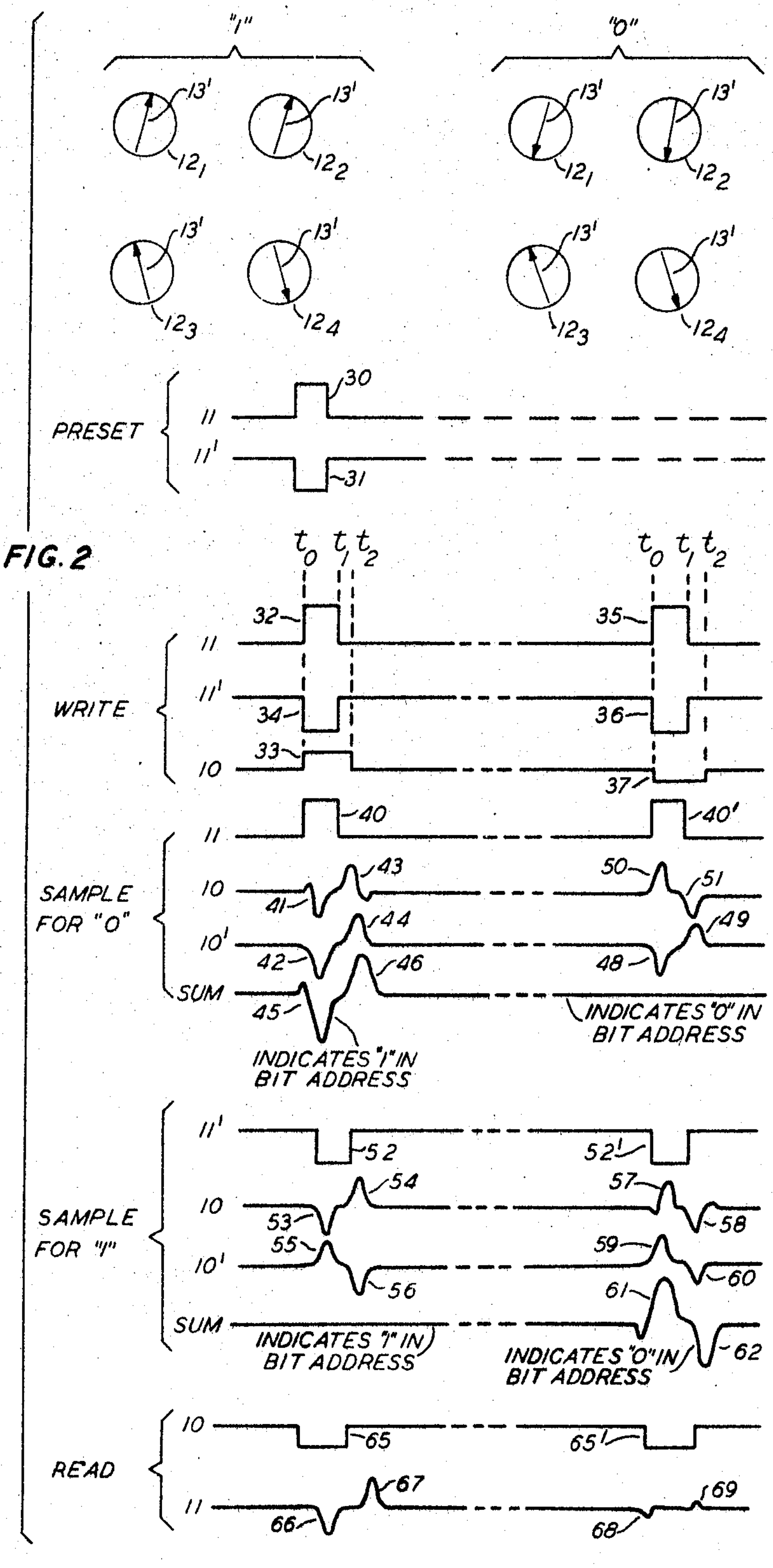
Figure 3:
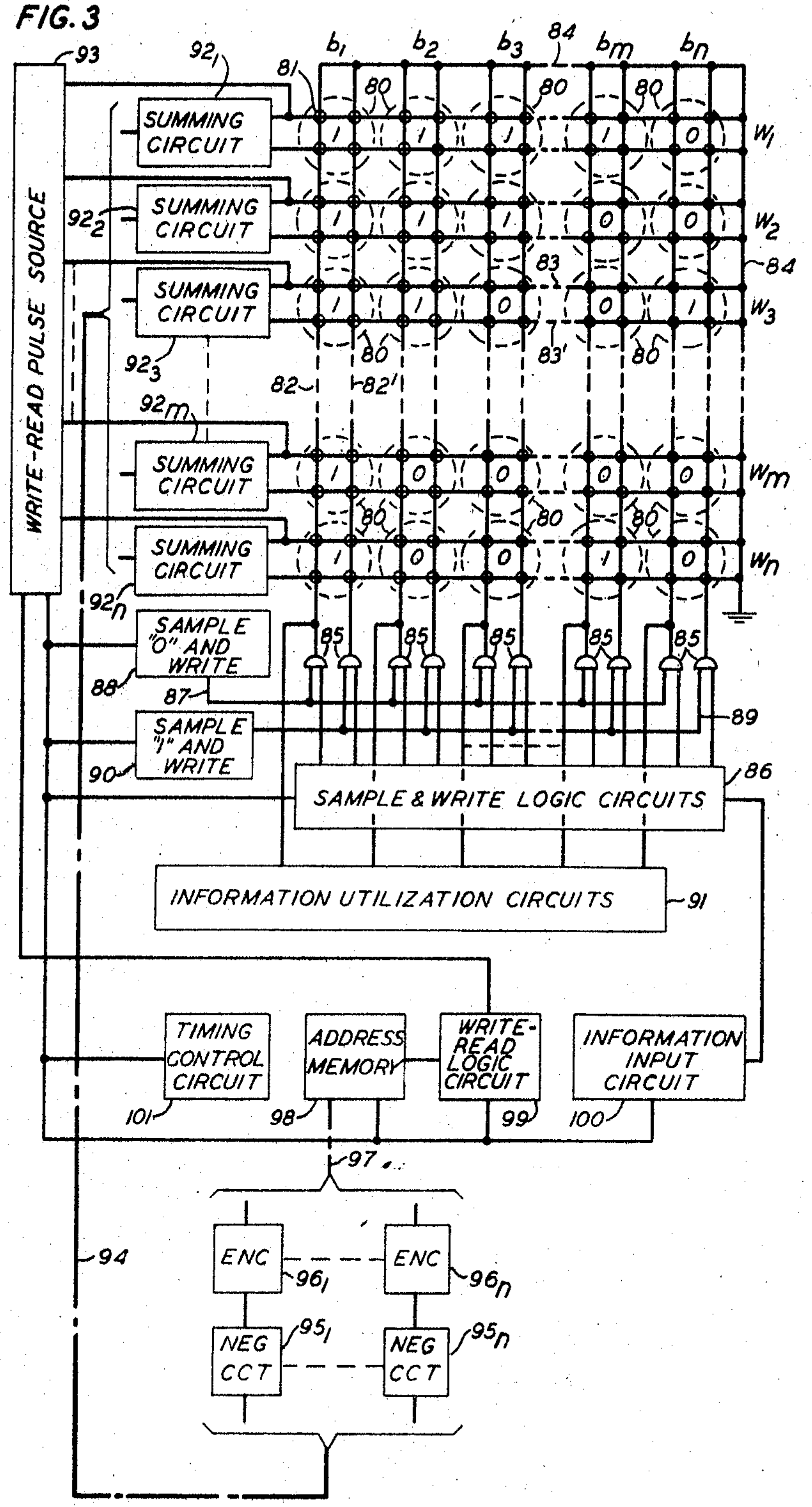

The organization and operation of a single bit address according to this invention and an associative memory circuit in which it is advantageously adapted for use will be better understood from a consideration of the detailed descriptions of illustrative embodiments thereof which follow when taken in conjunction with the accompanying drawing in which:

FIG. 1 depicts one specific illustrative single bit address circuit according to this invention;

FIG. 2 is a table comparing the magnetization states of the films of the single bit address circuit of FIG. 1 for the two binary values and which also compares the pulses appearing in the electrical circuits of the address during various operative phases the pulses being shown in idealized waveform; and FIG. 3 depicts the organization of an illustrative single plane associative memory arrangement employing as the basic storage address the single bit circuit of FIG. 1.

An illustrative circuit constituting a single bit address according to the principles of this invention is depicted in simplified form in FIG. 1. This circuit comprises a first and a second parallel pair of flat strip solenoids 10, 10', and 11, 11'. The solenoid pairs are arranged to intersect at the surfaces of four circular magnetic thin films $\mathbf{12}_1$, $\mathbf{12}_2$, $\mathbf{12}_3$, and $\mathbf{12}_4$. The films 12 are of a magnetic material having substantially rectangular hysteresis characteristic and a uniaxial anisotropy and may be affixed to a supitable substrate, not shown in the drawing, by any convenient means known in the art such as, for example, electrodeposition or vacuum evaporation. The parallel solenoids 10—10' and 11—11' are superimposed on the films 12 and are inductively coupled thereto. For consistency with the description of other embodiments of this invention to follow, the solenoids 10 and 10' will be assumed to lie in a word line of a word-organized memory and the solenoids 11 and 11' then lie in a bit line.

The solenoids 10 and 11, which are insulated from each other and the films 12, are arranged at substantially 90° to each other and the easy axis of magnetization of each of the films 12 lies at an angle to the axis of its bit line solenoid 11. Thus, as viewed in the drawing, the easy axes of the films $\mathbf{12}_1$ and $\mathbf{12}_2$ lie at angle in the clockwise direction from the vertical, or bit line axes of the solenoids 11 and $\mathbf{11}_2$, respectively, and the easy axes of the films $\mathbf{12}_3$ and $\mathbf{12}_4$ lie at an angle in the counterclockwise direction from the vertical, or bit line, axes of the solenoids 11 and 11', respectively. The angle of the easy axis of each of the films 12 may conveniently be 10° from the bit line solenoids 11 and 11', the easy axis for each of the films being designated in the drawing by the double-ended arrows 13. One of each of the solenoids 10 and 11 is connected to ground and the other ends are variously connected to exemplary energizing circuitry as follows. Each of the bit line solenoids 11 and 11' has connected at its other end a pulse source for controllably applying a sampling current pulse. The solenoid 11 has connected thereto a Sample "0" Source 14 and the solenoid 11' has connected thereto a Sample "1" Source 15. Also connected to the other ends of the solenoids 11 and 11' are, respectively, a Bit Write Pulse Source A, 17, and a Bit Write Pulse Source B, 18. A Sensing Circuit 19 is also connected to the other end of the solenoid 11. The word line solenoids 10 and 10' are each connected at the other end to a Summing Circuit 20 the output of which is available at an output terminal 21. The solenoid 10 is also connected at its other end to a Write-Read Pulse Source 22. Since the details of each of the exemplary circuits thus identified will readily be envisioned by one skilled in the art in view of their respective functions to be described, these circuits need not be shown or considered in greater particularity. With the foregoing organization of a single bit address circuit in mind, an illustrative information access cycle may now be described.

In the following illustrative operation of a single bit address circuit (and also in larger organizations in accordance with this invention) it is contemplated that the magnetic states which will differentiate between the two binary values will be contained in only two of the magnetic films, in this embodiment, in the films $\mathbf{12}_1$ and $\mathbf{12}_2$. The magnetic states of the films $\mathbf{12}_3$ and $\mathbf{12}_4$ will remain the same for either binary value. Accordingly, the latter magnetic states may be established in the bit address prior to the time the circuit is placed in operation and remain throughout the life of the bit address circuit. An illustrative cycle of operation will accordingly begin with the establishing of the permanent magnetic states of the applicable films 12 followed by a write phase demonstrating the introduction into the bit address of both binary values. A sampling of the information stored in the bit address is then described. A read phase concludes an operative cycle; since the circuit advantageously provides for nondestructive readout, no rewrite phase of operation is required after readout.

In FIG. 2 are depicted representations of the films 12 of the bit address circuit of FIG. 1 with arrows 13' indicating the directions of magnetization along the easy axes for both binary values. It is apparent from FIG. 2 that for both binary values the magnetization states of the films $\mathbf{12}_3$ and $\mathbf{12}_4$ remain unchanged, that is, the direction of the magnetization of the film $\mathbf{12}_3$ remains upward along the easy axis as viewed in the drawing and the direction of the magnetization of the film $\mathbf{12}_4$ remains downward along the easy axis. Prior to the introduction of the information representative magnetic states into the films $\mathbf{12}_1$ and $\mathbf{12}_2$, the foregoing magnetization states may be permanently established in the films $\mathbf{12}_3$ and $\mathbf{12}_4$. This may be accomplished as in the present embodiment by applying from the Source A, 17, a positive current pulse 30 at any given time to the solenoid 11. The pulse 30 is of a magnitude sufficient to induce a direction of magnetization in the film $\mathbf{12}_3$ at right angles to the axis of the bit line solenoid 11 and to the left as viewed in the drawing. Since the easy axis of the film $\mathbf{12}_3$ is inclined 10° in the same direction, the induced magnetization will be at an angle less than 90° from that easy axis and 10° from the hard axis of magnetization of the film $\mathbf{12}_3$. When the pulse 30 is terminated, the induced magnetization will rotate back to the easy axis in the direction presenting the least angular distance, which in the film $\mathbf{12}_3$ is upward as viewed in the drawing. Either coincidently with the pulses 30 or at some other given time, a negative second pulse 31, of the same magnitude as the pulse 30, is applied to the solenoid 11'. A magnetization is induced in the film $\mathbf{12}_4$ as a result which will also be at right angles to the axis of the bit line solenoid 11' and to the right as viewed in the drawing. When the pulse 31 is terminated, the induced magnetization will rotate back to the easy axis of the film $\mathbf{12}_4$ via the least angular distance, which in the film $\mathbf{12}_4$ is downward. Manifestly, the pulses 30 and 31 will also affect the magnetic states of the films $\mathbf{12}_1$ and $\mathbf{12}_2$. Although these magnetic states are irrelevant at this time, the film $\mathbf{12}_1$ will have a magnetization in the downward direction induced therein along its easy axis; the film $\mathbf{12}_2$ will have a magnetization in the upward direction induced therein along its easy axis by the pulses 30 and 31, respectively. The pulses 30 and 31 are depicted in idealized waveforms in FIG. 2 without regard to the "1" or "0" column.

With the presetting of the films $\mathbf{12}_3$ and $\mathbf{12}_4$, the manner in which the binary values are introduced in the information bearing films $\mathbf{12}_1$ and $\mathbf{12}_2$ during a write phase of operation may now be described. At a predetermined time $t_0$ a positive pulse 32 is applied to the solenoid 11 from the Bit Write Pulse Source A, 17. The pulse is of sufficient magnitude to generate a rotation field about the solenoid 11. The rotation field will normally be determined by the dispersion angle of the easy axis and the anistropic field of the film material. As the result of the applied pulse 32, a rotation of the magnetizations in each of the films $\mathbf{12}_1$ and $\mathbf{12}_3$ will be caused toward the hard axes of the films. The pulse 32 is so limited in amplitude with the result that it causes rotations of the magnetizations in the films $\mathbf{12}_1$ and $\mathbf{12}_3$ toward the hard axes which are insufficient to swing the magnetizations up to or past the hard axes. In the case of the films $\mathbf{12}_3$ the rotation will be counterclockwise as is evident from the drawing. Since the write phase may be accompanied at any time, we are not concerned with the direction of the magnetization, if any, previously residing in the film $\mathbf{12}_1$. In any event, as a result of the applied pulse 32, the magnetizations of the films $\mathbf{12}_1$ and $\mathbf{12}_3$ will be toward the left, that is, toward the hard axes of these films. At the time $t_1$ the pulse 32 is terminated with the result that the magnetization of the film $\mathbf{12}_3$ would ordinarily return to the direction established therein during the presetting operation described in the foregoing. However, at or about the time $t_0$ a positive tipping current pulse 33 is applied to the solenoid 10 alone from the Word Write-Read Pulse Source 22. The magnitude of the tipping pulse 33 is limited to generate a field less than the coercive field of the material of the films 12 and the pulse 33 is continued beyond the termination of the concurrently applied pulse 32 on the solenoid 11 to the time $t_2$. The tipping field so generated, by continuing after the pulse 32, causes the magnetization rotated out of its easy axis from whatever direction, to swing to the easy axis of the film $\mathbf{12}_1$ in its generally upward direction, which is the direction called for as representing a binary "1" in the film $\mathbf{12}_1$. Advantageously but not necessarily also at the time $t_0$ a negative pulse 34, identical in magnitude to the pulse 32, is applied to the solenoid 11' from the Bit Write Pulse Source B, 18. The limited pulse 34 causes a rotation of the magnetization in the film $\mathbf{12}_4$ toward the hard axis of that film which rotation is insufficient to swing the magnetization up to or past the hard axis. As a result, at the termination of the pulse 34 at the time $t_1$, the magnetization in the film $\mathbf{12}_4$ rotates back to the direction established during the presetting operation. The pulse 34 also causes a rotation of the magnetization in the film $\mathbf{12}_2$ but during its application and beyond to the time $t_2$, the tipping current pulse 33 is being applied to the solenoid 10. The magnetization in the film $\mathbf{12}_2$ is thus caused to swing to the easy axis of the film in the upward direction as viewed in the drawing which is also the state called for as representing a binary "1" in the latter film. Although it was assumed that the pulses 32 and 34 were applied coincidently and concurrently with the tipping pulse 33, it will be appreciated that the pulses 32 and 34 may be applied to accomplish their magnetization control separated in time. In such a case, each of the pulses 32 and 34 will be supplied with individual tipping current pulses 33 from the Source 22. The films $12_1$, $12_2$, $12_3$, and $12_4$ are now in magnetization states the combination of which is representative of a binary "1" as depicted in FIG. 2.

The four films of a bit address circuit according to this invention are magnetized by means of similar operations to store a binary "0." The magnetic states representative of a "0" are also depicted in FIG. 2 and differ from those representatives of a binary "1" in that the magnetizations of the film $12_1$ and $12_2$ are downward as viewed in the drawing instead of upward. To achieve these states, positive and negative current pulses 35 and 36 are applied to the solenoids 11 and 11', respectively, at the predetermined time $t_0$. The pulses 35 and 36 are identical to the pulses 32 and 34 applied to these solenoids to store a binary "1" and also cause magnetization rotation in each of the four films 12. In the case of the "0" bit, however, the tipping current pulse 37 applied from the Source 22 to the solenoid 10 is now negative. At its termination at the time $t_2$, which is also beyond the time $t_1$ at which the pulses 35 and 36 are terminated, the magnetizations in the films $12_1$ and $12_2$ will be urged toward the easy axis of these films in the downward direction, which is the direction called for as representative of a binary "0." Since no tipping current is applied to the solenoid 10', the magnetizations in the films $12_3$ and $12_4$ return to the states established during the presetting operation. The pulses 35, 36, and 37 are also shown in idealized waveform in FIG. 2 under the "0" column. With the representations of the binary values as magnetic states of the four films 12 of an exemplary bit address circuit of this invention as described in the foregoing, an illustrative sampling of the information stored therein may be considered.

The single bit address circuit according to this invention depicted in FIG. 1 is advantageously adapted for use in associative memory arrangements. In such arrangements, before an information word is read out, it is first determined whether the word corresponds to the criteria on which the readout is to be based. That is, it is first necessary to determine whether the information word contains the associative bits identifying the desired information word. As is known, the associative bits may be any number of the total bits of the word and may appear anywhere in the word. In a memory array of which the circuit of FIG. 1 may advantageously comprise a single bit address, each of the information words must be sampled to find the one containing the desired information. For purposes of describing an illustrative sampling operation, it will be assumed that the bit circuit of FIG. 1 contains an associative bit. The sampling operation for both a binary "1" and "0" when the bit address contains either binary value may now be considered.

Assume first that the bit address circuit of FIG. 1 contains a binary "1" and consider the case when a binary "0" is being searched for. In this case a positive current pulse 40 is applied from the Sample "0" Source 14 to the solenoid 11. The pulse 40 is only of sufficient magnitude to generate a rotation field about the solenoid 11 acting on the films $12_1$ and $12_3$. The rotation of the magnetizations in the latter film will be in the same counterclockwise directions toward the hard axes of these films. As a result, during the positive-going interval of the pulse 40, negative signals will be generated in the solenoids 10 and 10' and during the negative-going interval of the pulse 40, positive signals will be generated in these solenoids. These signals are designated 41 and 42, and 43 and 44, respectively, in FIG. 2. These signals are algebraically added in the Summing Circuit 20, the sum signal appearing on the output terminal 21. The sum signal will in this sampling be a large negative signal followed by a large positive signal, designated 45 and 46, respectively, in FIG. 2. This output indicates that, whereas a "0" was searched for in the bit address, the address was found to contain a "1." After the termination of the sampling pulses, the magnetizations of the films $12_1$ and $12_3$ return from the directions of the hard axes back to the easy axes of these films. This follows, it will be recalled, because the magnitude of the rotation field generated by the sampling pulses is less than that required to rotate the magnetizations beyond 90° from the easy axes of the films. The sampling operation is thus nondestructive and does not necessitate a rewrite operation.

Had the bit address, on the other hand, contained a binary "0"—the value that is being searched for—the rotation of the film $12_1$ would have been in the clockwise direction with the result that signals of polarities opposite to those of the signals 41 and 43 would be generated in the solenoid 10. The operative signals in idealized waveform are depicted in FIG. 2 under the "0" column for this sampling operation. Thus, a positive current pulse 40' applied from the Sample "0" Source 14 to the solenoid 11 again generates a rotation field which causes a counterclockwise rotation of the magnetization of the film $12_3$. This rotation induces a pair of signals 48 and 49 in the solenoid 10' identical to the signals 42 and 44 generated in the same solenoid when the bit address contains a binary "1." However, since in this case the bit address contains a "0," the rotation of the magnetization of the film $12_1$ will now be in a clockwise direction and positive-negative signals 50 and 51 will be generated in the solenoid 10. These signals, when algebraically added in the Summing Circuit 20, cancel, with the result that no effective signal appears on the output terminal 21. The absence of a signal at the terminal 21 responsive to a sample "0" indicates that the bit address contains the "0" bit being searched for.

When the single bit address circuit of FIG. 1 is searched for a binary "1," the Sample "1" Source 15 controlled to apply a sampling current pulse to the solenoid 11'. In this case, the sampling pulse, represented as the idealized wave form 52 in FIG. 2, is negative and it will first be assumed that the bit address circuit of FIG. 1 contains a binary "1." The rotation field generated about the solenoid 11' will rotate the magnetization in the film $12_2$ in a clockwise direction and the magnetization in the film $12_4$ in a counterclockwise direction. As a result, on the solenoid 10 will be induced a pair of negative and positive signals 53 and 54 and on the solenoid 10' will be induced a pair of positive and negative signals 55 and 56. These signals when applied to the Summing Circuit 20 will cancel and the absence of an effective signal on the output terminal 21 will indicate the presence in the bit address of the binary "1" which value the present sampling operation is intended to find. On the other hand, if the bit address circuit of FIG. 1 contains a binary "0," the application of a negative sampling current pulse 52' to the solenoid 11' will cause a counterclockwise rotation of the magnetization in the film $12_2$ toward the hard axis. As a result, instead of a negative-positive pair of signals, a positive-negative pair of signals 57 and 58 will be generated on the solenoid 10. The rotation in the film $12_4$ will remain the same with no change in the polarities of the signals generated in the solenoid 10'. These signals are represented in FIG. 2 by the waveforms 59 and 60. The sum output of these signals, when added in the Summing Circuit 20, will be the large output signals 61 and 62 indicating that, although a binary "1" was searched for in the sampling operation, the bit address contained a binary "0."

With the completion of the sampling of the contents of the bit address and assuming that the contents correspond to the predetermined element of associative criteria, the information in the address may now be read out. This is accomplished by controlling the Word Write-Read Pulse Source 22 to apply a read current pulse to the solenoid 10. The read current pulse 65 is negative as represented in FIG. 2 and may advantageously be of the same magnitude as the tipping current pulse 37 applied by the Pulse Source 22 to reduce complexity in the latter circuitry. However, if the magnitude of the tipping current is not large enough to give reasonable output, a large amplitude read pulse can also be used to give larger outputs provided the read pulse is short enough not to produce any wall motion switching. In the case of the storage of a binary "1," the pulse 65 rotates the magnetization of the film $12_1$ in a clockwise direction toward the hard axis of the film. As a result, a negative signal 66 is generated on the solenoid 11 when the pulse 65 is negative going and a positive signal 67 is so generated when the pulse 65 is terminated. These signal conditions are indicative of the storage in the bit address of a binary "1." Manifestly, a magnetization rotation will also occur in the film $12_2$. However, since no signal is taken from the solenoid 11', the voltage generated in the latter solenoid is disregarded.

If the bit address circuit of FIG. 1 contains a binary "0," an identical negative read current pulse 65' applied to the solenoid 10 from the Source 22 causes only a small rotation of the magnetization in the film $12_1$ in the counterclockwise direction toward the hard axis. As a result, as depicted in the "0" column of FIG. 2, only a negligible signal pair 68 and 69 are induced on the solenoid 11. The latter insignificant signals on the solenoid 11 are conventionally indicative of the storage in the bit address of a binary "0." All of the output signals indicative of the information stored in the bit address circuit of this invention may be utilized by circuitry well known in the art represented in FIG. 2 by the Sensing Circuit 19. During the read phase, it is clear that none of the affected magnetizations of the films are rotated near the hard axes of the films. As a result, after the termination of a read current pulse, the magnetizations of the affected films return to the easy axes, leaving the information stored in the bit address undisturbed.

It will be appreciated by one skilled in the art that the energizing circuits referred to in the foregoing operations of the illustrative circuit of FIG. 1 are controlled by logic and other circuits, not shown in the figure, which comprise part of the memory in which the single bit address of FIG. 1 is advantageously adapted for use. Illustrative circuits of this character which are external to the associative memory contemplated in this invention and their organization are considered in more detail in connection with the description of one specific associative memory array embodying the principles of this invention which now follows.

FIG. 3 depicts one illustrative associative memory embodying for its basic bit address the circuit of FIG. 1. The memory is organized as a coordinate array of bit lines $b_1$, $b_2$, $b_3$ . . . $b_m$, and $b_n$ and of word lines $w_1$, $w_2$, $w_3$ . . . $w_m$, and $w_n$, each bit and word line including a plurality of bit addresses 80. Each of the bit addresses 80, as outlined by the dashed circles in the drawing, includes a circuit as depicted in FIG. 1 which comprises four thin films 81 associated by two pairs of coupled solenoids 82–82' and 83–83'. The solenoids 82–82' are common to all of the corresponding films 81 of the bit addresses 80 of a word line $w$ and the solenoids 83–83' are common to all of the corresponding films 81 of the bit addresses 80 of a bit line $b$. Each of the solenoids 82–82' and 83–83' is connected at one end to a ground bus 84. The bit address elements, the details and operations of which have already been described in connection with FIG. 1, may also be affixed to an insulated substrate by any convenient manner known in the art, which substrate is not shown in the drawing.

The bit line solenoids 82–82' of each of the bit lines $b_1$ through $b_n$ are connected to the outputs of individual gates 85. One of the inputs of each of the gates 85 is connected to Sample and Write Logic Circuits 86. Another input of each of the gates 85 connected to the bit line solenoids 82 is connected to a common conductor 87 extended to a Sample "0" and Write circuit 88. The other input of each of the gates 85 connected to the bit line solenoids 82' is connected to a common conductor 89 which is extended to a Sample "1" and Write circuit 90. Each of the bit line solenoids 82 is also connected at its other end to Information Utilization Circuits 91.

The word line solenoids 83–83' of each of the word lines $w_1$ through $w_n$ are connected to individual Summing Circuits $92_1$ through $92_m$ and $92_n$, respectively. In addition, the solenoids 83 of each of the bit lines are connected to a Write-Read Pulse Source 93. The output of each of the Summing Circuits 92 is connected via a cable 94 to the respective inputs of a plurality of Negation Circuits $95_1$ through $95_n$ which in turn are connected respectively to a plurality of Encoders $96_1$ through $96_n$. Outputs of the latter circuits are carried via a cable 97 to an Address Memory 98, output signals of which memory are supplied to a Read Logic Circuit 99. The Sample and Write Logic Circuits 86 are supplied with associative criteria elements of the information words sampled in the memory of FIG. 3 by an Information Input Circuit 100. Timing control of the exemplary organization thus far described is provided by a Timing Control Circuit 101 which is connected to the Sample circuits 88 and 90, the Address Memory 98, the Write-Read Logic Circuit 99, the Write-Read Pulse Source 93, the Information Input Circuit 100, and the Sample and Write Logic Circuits 86. Each of the circuits and the connections thus listed in the foregoing, together with the particular organization shown, is intended only to demonstrate one specific associative memory arrangement advantageously employing the single bit address circuits of this invention. The details of the various circuits, which are depicted in block symbol form in the drawing, will readily be envisioned by one skilled in the art when apprised of the functions thereof to be considered hereinafter. Accordingly, the details of these circuits are not necessary for a complete understanding of this invention. It will also be appreciated that the functions to be described may be accomplished by other arrangements and organizations of control, logic, and other circuits within the scope of this invention.

The information-representative magnetic states of each bit address and the manner of gaining access to an address are identical to those already described in connection with the single bit address circuit of FIG. 1. Accordingly, in describing an illustrative cycle of operation of the memory circuit of FIG. 3, reference will be made to the table of FIG. 2 where necessary in order better to understand a particular operative step. The operation of the memory circuit of FIG. 3 assumes, as was the case of the single bit address circuit, the presetting of the films 81 lying along the word line solenoids 83' of each of the word lines $w$. This may be accomplished in any convenient manner before the memory circuit is placed in operation. The Sample circuits 88 and 90, for example, may be controlled by the Timing Control circuit 101 to apply a positive and a negative current pulse such as the pulses 30 and 31 depicted in FIG. 2 to the common conductors 87 and 89, respectively. At the same time, the Sample and Write Logic Circuits 86 are controlled by the same Control Circuit 101 to apply positive and negative enabling pulses to the gates 85. As a result, each of the films 81 lying along the solenoids 83' of the memory circuit, after the termination of the presetting pulses, will have magnetic states induced therein as indicated in the film representations 1, $2_3$ and $12_4$ of FIG. 2. With the presetting of the reference magnetic states in the films 81 completed, information may now be written into the memory.

The particular embodiment of an associated memory according to this invention shown in FIG. 3 is organized to write all of the corresponding bits of each of the word lines simultaneously rather than, in the conventional manner, to write all of the bits of an individual word simultaneously. This reversal of the normal write order is advantageously suited to the adaptation of the present memory circuit, for example, as a store for telephone directory information as previously noted. In an alphabetical arrangement of subscribers' names, initial identical letters of the names may in this manner be simultaneously written for a large group of names beginning with the same letters. For purposes of describing an illustrative write cycle, it will be assumed that the specific binary values as indicated in each of the bit addresses in FIG. 3 are to be stored in the memory. However, since the writing of the bits for each of the bit lines $b$ is identical, only the writing of an exemplary bit line $b_2$ will be described. Assuming then that the writing of the bit line $b_1$ has been completed, the Sample "0" and Write circuit 88 is controlled by the Timing Control Circuit 101 to apply a positive current pulse to the common conductor 87 and thereby to the gate 85 connected to the solenoid 82 of the bit line $b_2$. At the same time, the Sample "1" and Write circuit 90 is controlled by the Timing Control Circuit 101 to apply a negative current pulse to the common conductor 89 and thereby to the gate 85 connected to the solenoid 82' of the same bit line. The Sample and Write Logic Circuits 86 are also controlled by the Timing Control 101 to apply positive and negative enabling current pulses to the gates 85 of the solenoids 82 and 82', respectively, in this case, the particular gates enabled being determined by the Information Input Circuit 100. The gates 85 are alternatively adapted to respond to positive and negative input signals. Concurrently with the application of the write pulses to the solenoids 82 and 82' of the bit line $b_2$, the Write-Read Pulse Source 93 is controlled, also by the Timing Control Circuit 101 and the Write-Read Logic Circuit 99, to apply the necessary tipping current pulses to the solenoids 83 of each of the word lines to distinguish between the binary bits being written in the bit addresses. In accordance with the operation already described in connection with the circuit of FIG. 1, the source 93 will apply to the solenoids 83 of the word lines $w_1$, $w_2$, and $w_3$ positive tipping current pulses and to the solenoids 83 of the word lines $w_m$ and $w_n$ negative tipping current pulses. The second bit of the information words contained in the former word lines will in each case be a "1" and the second bit of the information words contained in the latter word lines will in each case be a "0." This operation is continued until all of the bits of each word are written into the word lines and the memory is then prepared for a subsequent sample operation.

As previously mentioned, the associate criteria elements of an information word which are to be compared with external information elements may appear anywhere in the word. However, for purposes of illustration, it will further be assumed that the memory is to be searched for an information word which contains as its first three bits the binary values 1, 1, 0, without regard to the character of the remaining bits of the word. Accordingly, all of the word lines of the memory are simultaneously sampled for an information word having these associative elements by applying the required sampling pulses from the Sample circuits 88 and 90. Thus, the Sample circuit 90 is controlled by the Timing Control Circuit 101 to apply a negative current pulse to the common conductor 89 and the Sample circuit 88 is similarly controlled to apply a positive current pulse to the common conductor 87. These current pulses are depicted in FIG. 2 as the pulses 52 and 40, respectively. The Information Input Circuit 100 controls the Sample and Write Logic Circuits 86 to apply the proper enabling pulses to the various gates 85 in accordance with the associative elements with which a match is desired during a sampling operation. For purposes of this description, it will be assumed that the Sample circuits 88 and 90 and the Logic Circuits 86 are controlled to apply timely pulses of the required polarity to the solenoids 82 and 82' in accordance with the exemplary sample operation.

Although the bit lines $b_1$, $b_2$, and $b_3$ will be sampled simultaneously, in order to demonstrate the manner in which the operations in the bit addresses of each word line combine to produce the required output signals, each bit line will be considered separately. In accordance with the associative information elements established as illustrative as indicated in the table of FIG. 2, negative sampling current pulses will be applied to the solenoids 82' of the bit lines $b_1$ and $b_2$ and a positive sampling current pulse will be applied to the solenoid 82 of bit line $b_3$. Responsive to the magnetization changes occurring in the bit addresses 80 of the bit line $b_1$, cancelling output signals will be generated in each of the solenoid pairs 83–83' of the word lines $w_1$ through $w_n$. This follows since each of these addresses contains a binary "1" which is the first associative element being searched for. In the bit addresses of the bit line $b_2$, cancelling output signals will similarly be generated responsive to the magnetization changes therein in each of the solenoid pairs 83–83' of the word lines $w_1$, $w_2$, and $w_3$ since these addresses also contain binary "1's." In the solenoid pairs 83–83' of the word lines $w_m$ and $w_n$, on the other hand, additive signals will be generated since the addresses there located contain binary "0's" which do not match the associative element being searched for in the bit line $b_2$.

In the final bit line $b_3$ being searched, a binary "0" is being searched for. As a result, the magnetization changes in the bit addresses in this bit line in the word lines $w_1$ and $w_2$ will have additive output signals generated in the coupled solenoid pairs 83–83'. Cancelling signals will be generated in the solenoid pairs 83–83' coupled to the bit addresses in the word dines $w_3$, $w_m$, and $w_n$ as a result of magnetization changes therein since these addresses contain the binary "0's" which value is the last of the exemplary associative elements searched for. In recapitulation it is apparent that, since in each of the word lines $w_1$, $w_2$, $w_m$, and $w_n$ at least one pair of additive signals is induced, each of the Summing Circuits $92_1$, $92_2$, $92_m$, and $92_n$ will produce output signals as illustrated by the waveforms 45–46 or 61–62 in FIG. 2. On the other hand, since a match was found for each of the associative elements in the word line $w_3$, and therefore cancelling output signals generated in the associated solenoid pair 83—83', no effective output signal will be produced by the Summing Circuit $92_3$. The output signal conditions of the Summing Circuits 92 are transmitted to the respective Negation Circuits 95, of which latter circuits only the Circuit $95_3$ is energized to produce an output responsive to the output conditions of the Summing Circuits 92. The signal produced by the Negation Circuit $95_3$ is indicative of the word line address in the memory of the information word which meets the conditions implied in the associative criteria elements. This signal is transmitted to an Encoder Circuit $96_3$ connected to the Negation Circuit $95_3$. The Encoder Circuits 96 each may be preset to generate a different code representative of the different word lines of the memory. When triggered by a signal from a Negation Circuit 95, the energized Encoder Circuit 96 then transmit the address code to the Address Memory 98 for temporary storage. In the present case an Encoder Circuit $96_3$ transmits the code representing the address of the information block searched for during the foregoing illustrative sampling operation; that is, the code representing the word line $w_3$, to the Address Memory 98.

The latter memory may comprise any suitable store arrangement known in the art and, for the single plane embodiment of the associative memory of FIG. 3, may comprise only a single word store. At the later time the Address Memory 98 may be read out under the timing control of the Timing Control Circuit 101 to transmit its address contents to the Write-Read Logic Circuit 99. The latter circuit translates the address coding into control signals to select the particular output of the Write-Read Pulse Source 93, which circuit is then energized responsive to the Timing Control Circuit 101 to apply a negative read current pulse, such as the pulse 65 depicted in the table of FIG. 2, to the solenoid 83 of the word line in which the desired information block was found.

During the read phase of the memory of FIG. 3, the read pulse is applied, for the present illustrative operation, to the solenoid 83 of the word line $w_3$. The resulting rotation field applied to the coupled film pairs of the bit addresses in this word line cause magnetization rotations therein as determined by the particular binary bits stored. In the readout solenoids 82 of the bit lines $b_1$, $b_2$, and $b_n$ the magnetization rotations will be sufficient to generate in the latter solenoids signals of the character depicted in the table of FIG. 2 as the signals 66 and 67 indicative of binary "1's." Simultaneously, in the readout solenoids 82 of the bit lines $b_3$ and $b_m$ the magnetization rotations will be negligible. The resulting signal conditions in the latter solenoids will not be significant, these conditions being representative of the storage in the coupled films of binary "0's." The signals representative of the information word stored in the exemplary word line $w_3$ are transmitted to the Information Utilization Circuits 91 which circuits are also understood to include the sensing amplifiers and other circuitry known in the art for the detection of the information signals read out of the memory. As previously noted, the readout is nondestructive and the memory after a readout operation is immediately prepared for another write or sampling operation.

The simplified organization of an associative memory according to this invention depicted in FIG. 3 is by way of example only as was previously mentioned and it will be apparent to one skilled in the art that it makes no provision for other functions frequently performed by associative memories. Thus, it will be appreciated that, during a sampling operation, more than one information word may be found which matches the associative criteria elements. The present memory, in the interest of simplicity, omits system components which will control successive sampling operations until a particular information word is found. Thus, in practice the Information Input Circuits 100 may be controlled to provide additional associative elements to reduce to a single information word the possibility of finding a match. In the memory of FIG. 3 it is assumed that the three exemplary associative elements 1, 1, 0, will find only a single match. Other system organizations will be envisioned by one skilled in the art; however, since such organizations lie outside of the scope of this invention they are mentioned here only in passing. Similarly, the circuits external to the film array described only in terms of function in the foregoing may take various and numerous forms, the details of which will also readily present themselves to one skilled in the art and which are therefore also outside of the scope of this invention.

Further, although in the foregoing descriptions the thin magnetic films were contemplated to comprise discrete elements at the intersections of the defining solenoids, it will also be appreciated that other arrangements for achieving the storage elements may be provided within the scope of this invention. Thus, for example, the film storage elements may comprise discrete film areas defined by the intersecting solenoids on a continuous sheet of film deposited or otherwise affixed to a substrate. In such a case, for example, an array which is organized as a single plane may comprise two separate substrates with all of the film sheet on one having the easy axis of magnetization inclined in one direction and all of the film sheet of the other having the easy axis of magnetization inclined in the opposite direction. Solenoids common to the two substrates in one set of coordinates of the array and solenoids on each of the substrates in the other set of coordinates of the array then functionally organize the bit addresses in the relationships depicted in FIGS. 1 and 3. Manifestly, the functional organizations of the embodiments shown in the latter figures and other embodiments falling within the scope of this invention may be achieved in any physical organization of the element as may be dictated by the manner of assembly and the realization of the individual storage films.

What have been described are considered to be only specific illustrative embodiments of this invention, and it is to be understood that various other arrangements may be devised by one skilled in the art without departing from the spirit and scope thereof as defined by the accompanying claims.

What is claimed is:

1. A memory circuit comprising a first and a second pair of electrical conducting means, the conducting means of each of said first and second pairs being arranged to intersect each of the conducting means of the other pair, a plurality of magnetic thin films inductively coupled to the intersections of the conducting means of said first and second pairs of conducting means, said thin films each having a uniaxial anisotropy and substantially rectangular hysteresis characteristics, the easy axis of magnetization of each of said films being at an angle to each of the conducting means intersecting at a film, means for establishing remanent magnetizations in particular directions along said easy axes in said films representative of stored information, means for sampling said stored information comprising means for selectively applying a sampling pulse to the conducting means of one pair of said first and second pairs of conducting means, and means for adding signals generated in another pair of the conducting means to generate an output signal indicative of said stored information, means for applying a readout pulse to one of the conducting means of said another pair of said first and second pairs of conducting means, and means for detecting output signals also indicative of said stored information in one of the conducting means of said one pair of said first and second pairs of conducting means.

2. A memory circuit comprising a first and a second pair of electrical conducting means, each of the conducting means of said first pair being arranged to intersect each of the conducting means of said second pair, a plurality of magnetic film areas inductively coupled to the intersections of said first and second pair of conducting means, each of said film areas having uniaxial anisotropy and substantially rectangular hysteresis characteristics, means for inducing magnetizations of particular directions along the easy axes of magnetizations of said film areas representative of stored information, and sampling means for determining the character of said stored information comprising means for selectively applying a sampling pulse to one conducting means of said first pair to cause magnetization rotation in the film areas coupled to the intersections of the last-mentioned conducting means and each of the conducting means of said second pair and means for obtaining a sum of the signals generated in each of the conducting means of said second pair by said magnetization rotations, said sum being indicative of said stored information.

3. A memory circuit according to claim 2 also comprising readout means for also determining the character of said stored information comprising means for applying a readout pulse to one conducting means of said second pair of conducting means to cause magnetization rotations in the film areas coupled to the intersections of the last-mentioned conducting means and each of the conducting means of said first pair, and means for detecting signals generated in at least one of the conducting means of said first pair.

4. A memory circuit comprising a plurality of magnetic thin film elements each having a uniaxial anisotropy and substantially rectangular hysteresis characteristics, a first plurality of electrical conducting means inductively coupled to individual first groups of said plurality of film elements, a second plurality of electrical conducting means inductively coupled to individual second groups of said plurality of film elements, each of the film elements of said first groups also appearing in only one group of said second groups of film elements, means for inducing information magnetizations in the film elements of one group of said first groups, means for inducing reference magnetizations in the film elements of another group of said first groups, and means for sampling said information magnetizations comprising means for selectively applying current pulses to said second plurality of conducting means to cause magnetization rotations in the film elements of one group of said second groups and means for obtaining a sum of the signals generated in each of the conducting means of said first plurality of conducting means.

5. A memory circuit as claimed in claim 4 in which said film elements are arranged at the crosspoints of a coordinate array and in which said first and second plurality of conducting means lie in first and second coordinates of said array, respectively.

6. A memory circuit as claimed in claim 5 in which each of the conducting means of said first plurality of conducting means comprises a flat strip solenoid intersecting with each of the conducting means of said second plurality of conducting means, each of the last-mentioned conducting means also comprising a flat strip solenoid.

7. A memory circuit comprising four magnetic films each having a uniaxial anisotropy and substantially rectangular hysteresis characteristics, a pair of orthogonal conducting means coupled to each of said films, the easy axis of magnetization of each of said films being inclined at an angle to the corresponding conducting means coupled to said films, a first pair of said films having reference magnetizations established therein along said easy axes in one direction, a separate, second pair of said films having information magnetizations established therein along said easy axes in particular directions representative of stored information, and means for sampling said stored information comprising means for selectively applying sampling pulses to corresponding conducting means of one film of said first pair of films and to one film of said second pair of films to cause magnetization rotations in the last-mentioned films and means for obtaining a sum of the signals generated in each of the corresponding other conducting means of each of said last-mentioned films.

8. A memory circuit as claimed in claim 7 also comprising readout means comprising means for applying a readout pulse to one of the conducting means of one film of said second pair of films to cause a magnetization rotation in the last-mentioned film, and means for detecting signals generated in the other conducting means of said one film of said second pair of films.

9. A memory circuit comprising a plurality of magnetic thin films each having a uniaxial antisotropy and substantially rectangular hysteresis characteristics, a plurality of conducting means each being inductively coupled to a different pair of said plurality of films, each film of each pair of films being common to at least another pair of films, means for establishing remanent magnetizations in said films along the easy axes of magnetization representative of stored information, and means for sampling said stored information comprising means for applying a sampling current pulse to a selected conducting means of a first and second ones of said conducting means coupled respectively to a first and second pair of films having no films in common in accordance with predetermined information and means for obtaining a sum of signals generated in a third and fourth conducting means inductively coupled respectively to a third and fourth pair of films each having a film in common with each of said first and second pair of films.

10. A memory circuit as claimed in claim 9 also comprising readout means comprising means for applying a readout current pulse to said third conducting means and means for detecting signals generated in one of said first and second conducting means.

11. A memory circuit comprising four magnetic thin film areas inductively coupled to the intersections of a first and a second parallel pair of orthogonally arranged electrical conductors, each of said film areas having a uniaxial anisotropy and substantially rectangular hysteresis characteristics, each of said film areas being magnetized in particular directions along easy axes of magnetization inclined at an angle with the axes of said first pair of parallel conductors representative of a stored binary information value, means for interrogating said memory circuit for one of said binary values comprising means for applying a first sampling pulse to one conductor of said first pair of conductors, means for interrogating said memory circuit for the other of said binary values comprising means for applying a second sampling pulse to the other conductor of said first pair of conductors, and output means for detecting output signals generated in each conductor of said second pair of parallel conductors.

12. A memory circuit as claimed in claim 11 in which said output means comprises summing circuit means for adding said output signals.

13. A memory circuit as claimed in claim 11 also comprising readout means comprising means for applying a readout current pulse to one conductor of said second pair of conductors and means for detecting information signals in one conductor of said first pair of conductors.

14. A memory circuit comprising four magnetic elements each having substantially rectangular hysteresis characteristics, two electrical conductors coupled to each of said elements, a first pair of said elements having reference magnetizations induced therein and a separate, second pair of said elements having magnetizations representative of stored binary values induced therein, first means for sensing said binary values comprising means for applying a sampling current to one of the conductors coupled to one element of said first pair of elements and to one of the conductors coupled to one element of said second pair of elements when sensing for one binary value to cause magnetization changes in said last-mentioned elements, means for applying a sampling current to one of the conductors coupled to the other element of said first pair of elements and to one of the conductors coupled to the other element of said second pair of elements when sensing for the other binary value to cause magnetization changes in said last-mentioned elements, and output circuit means connected to the other conductors coupled to each of said four elements energized responsive to potentials induced thereacross by said magnetization changes for generating an output signal indicative of the presence in said memory circuit of a particular binary value.

15. A memory circuit as claimed in claim 14 in which said one conductor coupled to said one element of said first pair of elements and said one conductor coupled to said one element of said second pair of elements are serially connected and said one conductor coupled to said other element of said first pair of elements and said one conductor coupled to said other element of said second pair of elements are also serially connected.

16. A memory circuit as claimed in claim 14 in which said other conductors coupled to each of the elements of said first pair of elements are serially connected and said other conductors coupled to each of the elements of said second pair of conductors are also serially connected and in which said output means comprises means for adding said potentials induced in said serially connected other conductors.

17. A memory circuit as claimed in claim 16 also comprising readout means comprising means for applying a readout current to said serially connected conductors coupled to said second pair of elements and sensing means connected to said serially connected conductors coupled to corresponding elements of said first and second pairs of elements.

18. A memory circuit for storing binary information values comprising a first and a second pair of substantially parallel electrical conducting means, said first pair of conducting means intersecting said second pair of conducting means at an angle to define four crosspoints, a plurality of magnetic elements inductively coupled respectively to one conducting means of each of said first and second pairs of conducting means at said crosspoints, each of said elements having substantially rectangular hysteresis characteristics and an easy axis of magnetization inclined at an angle to the conducting means of said second pair of conducting means, the elements coupled to one of the conducting means of said first pair of conducting means having reference magnetizations induced therein along said easy axis, write means for inducing information magnetizations in the elements coupled to the other conducting means of said first pair of conducting means comprising means for applying first write current pulses to each of the conducting means of said second pair of conducting means and means for applying second write current pulses of polarities corresponding to said binary information values to said other conducting means of said first pair of conducting means; means for sensing said binary information values comprising means for applying a sampling current pulse to a selected conducting means of said second pair of conducting means and means for combining signals appearing on each of conducting means of said first pair of conducting means to generate output signals indicative of said binary information values; and readout means for subsequently reading out said binary information values comprising means for applying a readout current pulse to said other conducting means, and means for sensing readout signals generated in one conducting means of said second pair of conducting means.

19. A memory circuit for storing binary information values as claimed in claim 18 in which each of said magnetic elements comprises a thin film area having a uniaxial anisotropy.

20. A memory circuit comprising a first and a second magnetic film each having a uniaxial anisotropy and substantially rectangular hysteresis characteristic, a first and a second conductor coupled to each of said films, said first and second conductors of each of said films intersecting at substantially right angles, the easy axis of magnetization of each of said films lying at an angle with said first conductors, said first film having a reference magnetization in one direction induced therein, means for inducing remanent magnetizations in said second film corresponding to stored binary information values, and means for sensing said stored information values comprising means for applying sampling pulses to said first conductors of each of said films and means for combining signals generated in each of said second conductors for generating an output signal indicative of said stored binary information.

21. A memory circuit as claimed in claim 20 also comprising readout means comprising means for applying a readout pulse to the second conductor of said second film and means for sensing signals generated in said first conductor of said last-mentioned films.

22. A memory circuit comprising a first and a second magnetic film each having a uniaxial anisotropy and substantially rectangular hysteresis characteristics, a first conducting means coupled to both of said first and second films, a second and third conducting means coupled respectively to said first and second films and arranged substantially orthogonally to said first conducting means, said first film having an easy axis of magnetization inclined to one side of said first conducting means and said second film having an easy axis of magnetization inclined to the other side of said first conducting means, said first film having a reference remanent magnetization induced therein in one direction along said easy axis, said second film having a remanent magnetization induced therein in a direction representative of binary information also along said easy axis, and sensing means for sensing said information comprising means for applying a sampling current pulse to said first conducting means and summing means for adding signals generated in each of said second and third conducting means.

23. A memory circuit as claimed in claim 22 also comprising readout means comprising means for applying a readout pulse to said third conducting means and means for detecting readout signals generated in said first conducting means.

24. A memory circuit as claimed in claim 23 also comprising a third and fourth magnetic film also having a uniaxial anisotropy and substantially rectangular hysteresis characteristics, a fourth conducting means coupled to both of said third and fourth magnetic films, said second and third conducting means also being coupled respectively to said third and fourth magnetic films and arranged substantially orthogonally to said fourth conducting means, said third film having an easy axis of magnetization inclined to one side of said fourth conducting means and said fourth film having an easy axis of magnetization inclined to the other side of said fourth conducting means, said third film having a reference remanent magnetization induced therein in a direction opposite to that induced in said first film, said fourth film having a remanent magnetization induced therein in the same direction as that of said second film, and in which said sensing means also comprises means for applying a sampling current pulse to said fourth conducting means.

25. A memory circuit comprising a plurality of bit addresses each comprising four magnetic films each having a uniaxially anisotropy and substantially rectangular hysteresis characteristics and a pair of orthogonal conducting means coupled to each of said films, the easy axis of magnetization of each of said films being inclined at an angle to the corresponding conducting means coupled to said films, a first pair of said films having reference magnetizations established therein along said easy axes in one direction, a separate second pair of said films having information magnetizations established therein along said easy axes in particular directions representative of stored information; means for connecting one of the conducting means of each of the films of said first pair of films of each of said bit addresses in series, means for connecting one of the conducting means of each of the films of said second pair of films of each of said bit addresses in series, means for sampling said stored information comprising means for selectively applying sampling pulses to the other conducting means of each of said second pair of films of particular ones of said bit addresses, the particular conducting means of said second pair of films in each bit address being determined by pre-established binary values, and summing means connected to the series connected conducting means of said first pair of films and to the conducting means of said second pair of films for obtaining a sum of signals generated in these last-mentioned conducting means.

26. A memory circuit as claimed in claim 25 also comprising readout means comprising means for applying a readout pulse to the series connected conducting means of said second pairs of films and means for detecting signals generated in one of the other conducting means of each of said bit addresses.

27. A memory circuit comprising a plurality of bit addresses each comprising four magnetic thin films each having a uniaxial anisotropy and substantially rectangular hyteresis characteristics, a first conducting means inductively coupled to a first pair of said films in each of said bit addresses, a second conducting means inductively coupled to a second pair of said films in each of said bit addresses, individual third conducting means for each of said bit addresses inductively coupled to a third pair of said films of each of said bit addresses, and individual fourth conducting means for each of said bit addresses inductively coupled to a fourth pair of said films of each of said bit addresses, said third pair of films including one of the films of said first pair of films and one of the films of said second pair of films of each of said bit addresses and said fourth pair of films including the other of the films of said first pair of films and the other of the films of said second pair of films of each of said bit addresses, each of said films being magnetized in particular directions along easy axes of magnetization inclined at an angle with the axes of said third and fourth conducting means in each of said bit addresses representative of stored binary information values, means for selectively sampling the stored information values of said bit addresses comprising means for applying a sampling pulse to the third conducting means of predetermined ones of said bit addresses when sampling for one binary value, means for applying a sampling pulse to the fourth conducting means of said predetermined ones of said bit addresses when sampling for the other binary value, and output means connected to said first and second conducting means energized responsive to potentials generated in the last-mentioned conducting means for generating a signal indicative of said stored information values.

28. A memory circuit as claimed in claim 27 in which said output means comprises a summing circuit for adding said potentials.

29. A memory circuit as claimed in claim 28 also comprising readout means comprising means for subsequently applying a readout current pulse to said first conducting means and means for detecting information potentials in one of said third and fourth conductors in each of said bit addresses.

30. An associative memory comprising a coordinate array of bit addresses organized in word lines and bit lines, each of said word lines having two conductors and each of said bit lines also having two conductors, a magnetic storage element coupled to the intersection of each of said bit and word line conductors, each of said elements having substantially rectangular hysteresis characteristics, each of the elements in each of said word lines coupled to one word line conductor having a reference remanent magnetic state therein, each of the elements in each of said word lines coupled to the other word line conductor having a remanent magnetic state therein representative of a particular binary value, means for sampling each of said word lines for predetermined binary values in particular ones of its bit addresses comprising means for applying a sampling pulse to one of the bit line conductors of said particular ones of said bit addresses when sampling for one binary value, means for applying a sampling pulse to the other bit line conductor of said particular ones of said bit addresses when sampling for the other binary value, and summing means connected to the two conductors of each of said word lines energized responsive to signals in the last-mentioned conductors for generating an output signal indicative of the presence in one of said word lines of said predetermined binary values in said particular ones of said bit addresses.

31. An associative memory as claimed in claim 30 also comprising means responsive to said output signal for generating a code signal indicative of said one of said word lines, a read pulse source connected to said other word line conductor of each of said word lines, said read pulse source connected to said other word line conductor of said one of said word lines being energized responisve to said code signal for applying to readout pulse to said last-mentioned other word line conductor, and means for detecting information potentials in one of said bit line conductors of each of said bit lines.

32. An associative memory as claimed in claim 31 in which each of said magnetic storage elements comprises an area of thin magnetic film having a uniaxial anisotropy and an easy of magnetization inclined at an angle with the coupled bit line conductor.

33. An information storage circuit comprising a first and a second pair of individual magnetic film elements, a first and a second word connecting means coupled to said first and second pair of film elements, respectively, a first and a second bit conducting means coupled to the corresponding film elements of said first and second pair of film elements, respectively, the film elements of said first pair of film elements having easy axes of magnetization inclined at an angle to one side of said bit conducting means and the film elements of said second pair of film elements having easy axes of magnetization inclined at an angle to the other side of said bit conducting means, said film elements being magnetized in particular combinations of directions along said easy axes in accordance with a binary value stored in said storage circuit, means for sensing said stored binary value comprising means for applying a sensing current to one of said bit conducting means for one binary value and means for applying a sensing current to the other of said bit conducting means for the other binary value and first detecting means connected to said word conducting means for comprising signals generated in each of said last-mentioned means by flux changes in corresponding ones of the film elements of said film element pairs; and means for subsequently reading out said stored binary value comprising means for applying a readout current to one of said word conducting means and second detecting means connected to one of said bit conducting means.

References Cited

UNITED STATES PATENTS

| | | | |
|---|---|---|---|
| 3,003,139 | 10/1961 | Perkins | 340—174 |
| 3,015,809 | 1/1962 | Myers | 340—174 |
| 3,144,641 | 8/1964 | Raffel | 340—174 |
| 3,293,626 | 12/1966 | Thome | 340—174 |
| 3,187,312 | 6/1965 | Ulrich | 340—174 |
| 3,218,616 | 11/1965 | Huijer et al. | 340—174 |
| 3,311,901 | 3/1967 | Fedde et al. | 340—174 |
| 3,231,874 | 1/1966 | James | 340—174 |
| 3,264,620 | 8/1966 | Bobeck | 340—174 |
| 3,319,233 | 5/1967 | Amemiya et al. | 340—174 |

OTHER REFERENCES

Publication I: IBM Technical Disclosure Bulletin, "Word-Oriented Memory" by Bruce et al. vol. 3, No. 10, March 1961, pp. 109–110, 340–174, No. 211.

STANLEY M. URYNOWICZ, Jr., Primary Examiner